(No Model.) 3 Sheets—Sheet 1.
E. THOMSON.
SYSTEM OF ELECTRIC DISTRIBUTION.
No. 360,122. Patented Mar. 29, 1887.
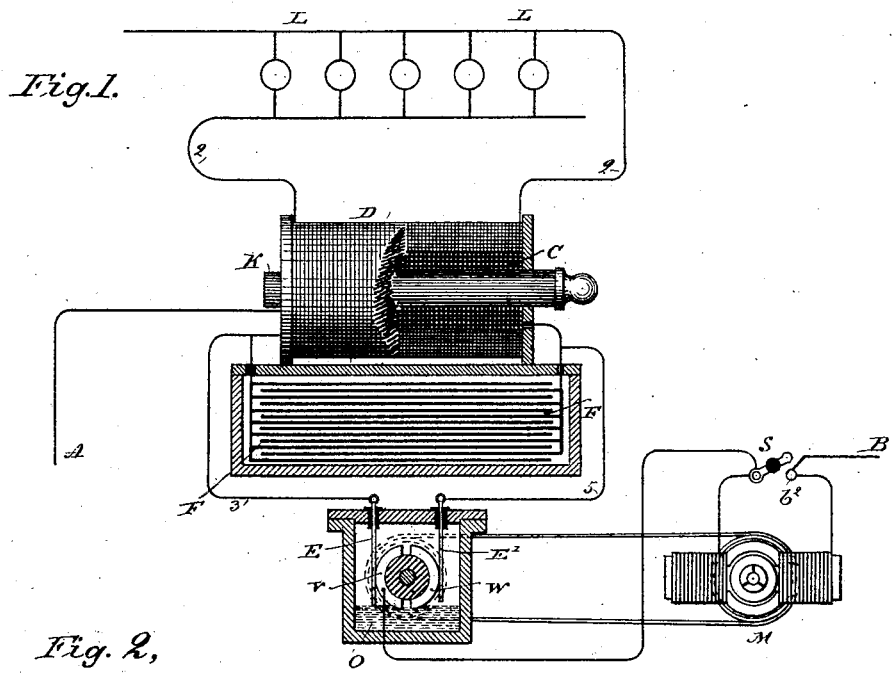
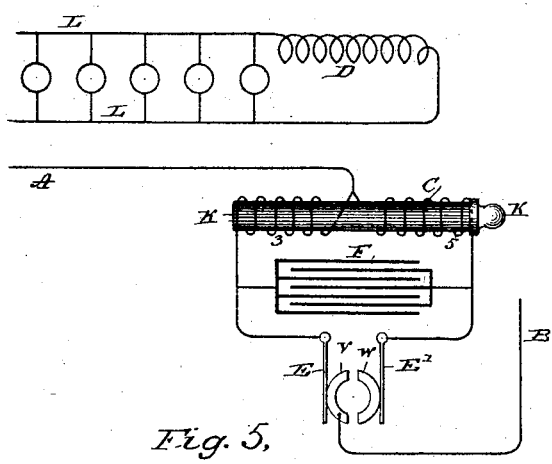
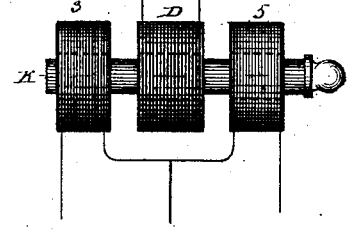
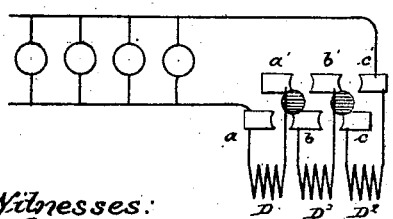
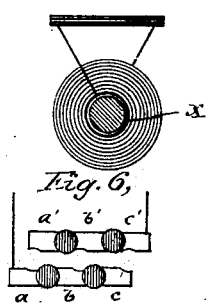
Witnesses:
Inventor: Elihu Thomson
By his Attorney:

(No Model.) 3 Sheets—Sheet 2.
E. THOMSON.
SYSTEM OF ELECTRIC DISTRIBUTION.
No. 360,122. Patented Mar. 29, 1887.
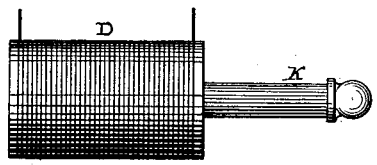
Fig. 7.
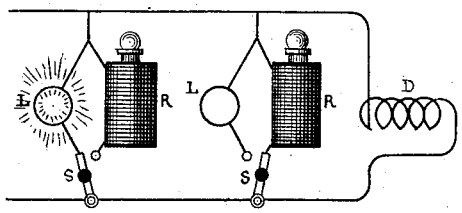
Fig. 8.
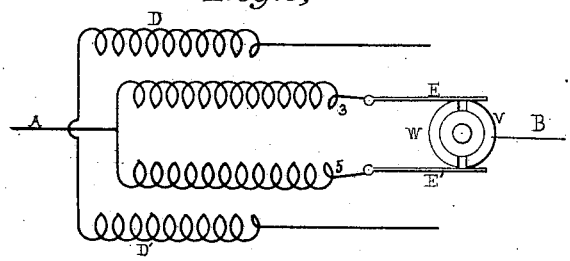
Fig. 9.
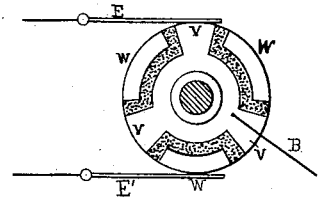
Fig. 10.
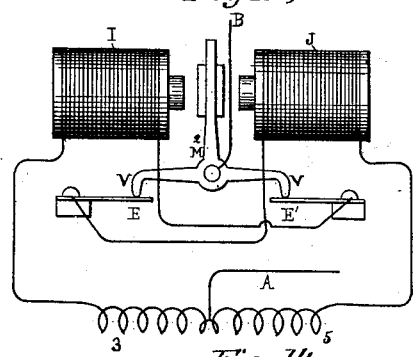
Fig. 11.
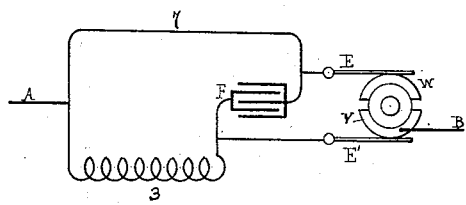
Fig. 12.
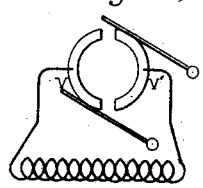
Fig. 14.
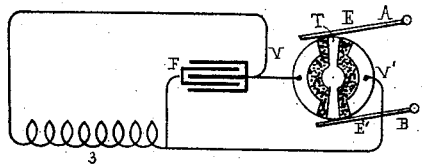
Fig. 13.
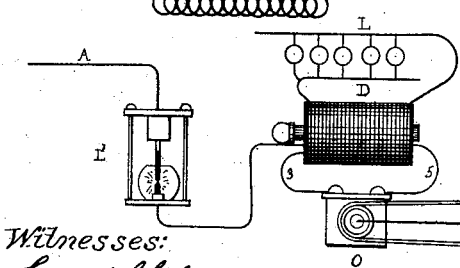
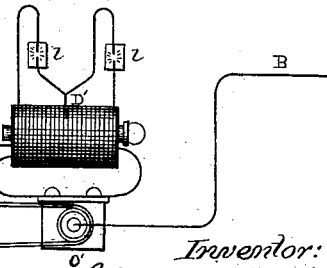
Fig. 15.
Witnesses:
Ernest Abshagen
Thos. Toomey
Inventor:
Elihu Thomson
By his Attorney:

(No Model.) 3 Sheets—Sheet 3.
E. THOMSON.
SYSTEM OF ELECTRIC DISTRIBUTION.
No. 360,122. Patented Mar. 29, 1887.
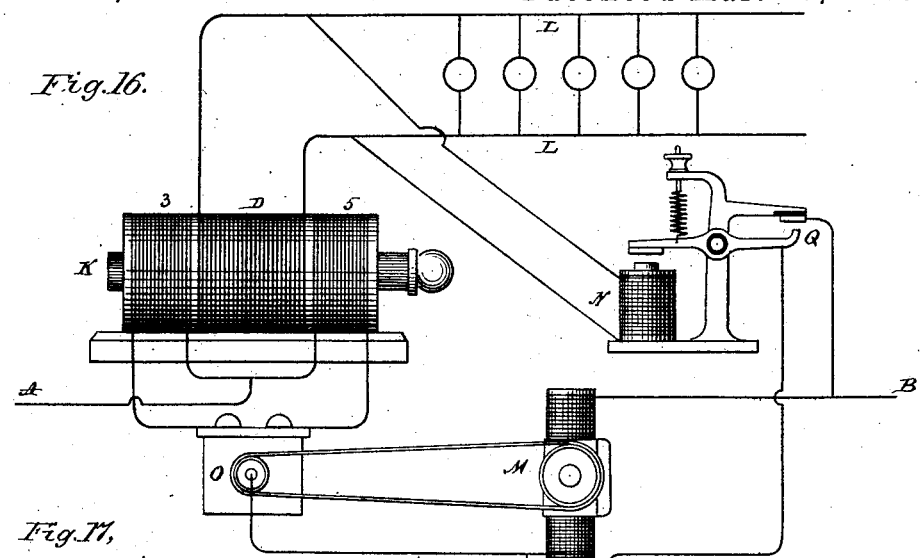
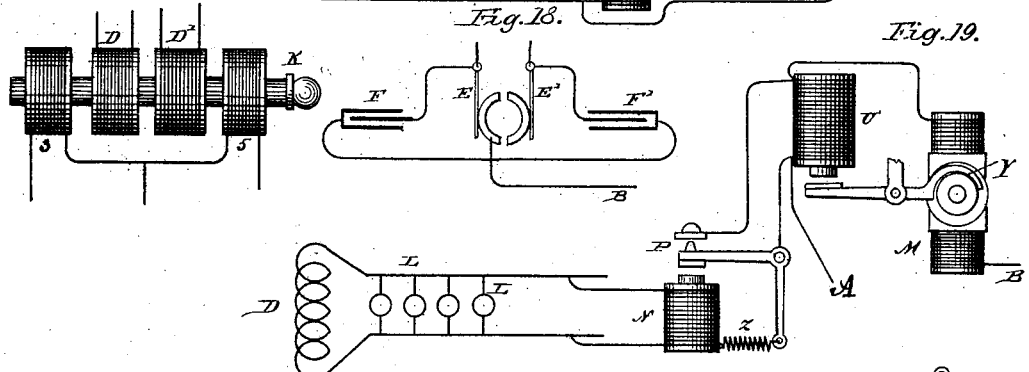
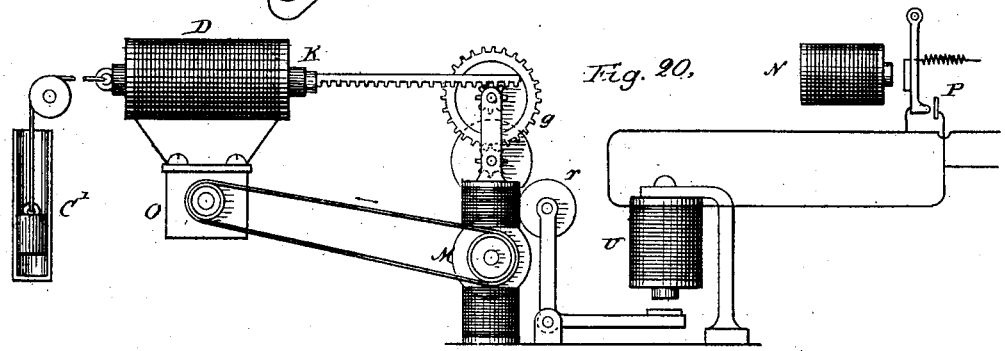
Witnesses:
Ernest Abshagen
Thos. Downey
Inventor:
Elihu Thomson
By his Attorney: K. C. Townsend

United States Patent Office.

ELIHU THOMSON, OF LYNN, MASSACHUSETTS, ASSIGNOR TO THE THOMSON-HOUSTON ELECTRIC COMPANY OF CONNECTICUT.

SYSTEM OF ELECTRIC DISTRIBUTION.

SPECIFICATION forming part of Letters Patent No. 360,122, dated March 29, 1887.

Application filed May 21, 1884. Serial No. 132,249. (No model.)

*To all whom it may concern:*

Be it known that I, ELIHU THOMSON, a citizen of the United States, and a resident of Lynn, in the county of Essex and State of Massachusetts, have invented certain new and useful Improvements in Systems of and Apparatus for Electric Distribution, of which the following is a specification.

The object of the present invention is to provide a means whereby a main electric circuit conveying a continuous and constant, or approximately constant, current may be made to supply a local line or circuit entirely independent of any electric contact or connection between the main and local circuits, and without interruption or disturbance of current in the main circuit, whereby arc lights, electric motors, or other electrical apparatus may be used or operated on the main circuit by current supplied from any source connected with said circuit, while upon the local or independent circuits incandescent electric lights or other electric apparatus may be used or operated with a current either of the same or different potential from that flowing upon the main circuit.

My invention is especially designed for the purpose of operating electric-arc lamps and incandescent lamps from the same current source, but in such way as to avoid the danger in the incandescent circuit or circuits of shocks and grounds that would affect the operation of the arc lights.

My invention consists in the combination, with a continuous line-circuit and continuous current-supply in said circuit, of one or more induction-coils and commutating devices adapted to change, shift, or modify the current in the primary coil or coils for the purpose of setting up currents in the secondary coil without rupturing the line-circuit supplying the primary, and without disturbing the flow of current in said line-circuit through arc lamps or other apparatus located upon other portions of the same.

My invention consists, also, in regulating the action of the induction-coil for the purpose of adjusting the current set up in the secondary circuit by means of an electro-magnet, or other device responsive to electric currents, connected with the secondary of said induction-coil. Said magnet or other device is the controlling-magnet, and is arranged to act directly or indirectly upon some mechanism whereby the strength or intensity of the currents given off by the secondary coil of an induction-coil may be adjusted or varied. Among the devices that will suggest themselves to those skilled in the art as applicable for this purpose are a movable or adjustable core for the induction-coil, an adjustable secondary coil, and mechanism whereby the speed of the commutator for the primary may be varied, &c. I do not limit myself, however, as to the particular regulating device or mechanism, but design employing any that will effect such purpose, the gist of my invention consisting in governing the action of such mechanism by a magnet or other device connected with the secondary of the induction-coil.

My invention consists, also, in certain details of construction and combinations of devices, that will be hereinafter described, and then specifically stated in the claims.

In the accompanying drawings, Figure 1 illustrates diagrammatically an arrangement of induction-coil commutator and circuits for carrying out my invention. Fig. 2 is a diagram showing the secondary and primary coils separated. Fig. 3 illustrates a modified arrangement of the primary where a primary coil in two divisions is employed. Fig. 4 is an end view of the induction-coils shown in Fig. 3. Figs. 5 and 6 illustrate arrangements of switches employed for adapting the electromotive force of the secondary current to the requirements. Fig. 7 is a side view of an induction-coil, illustrating an adjustable core. Fig. 8 is a diagram illustrating a means whereby lights may be cut out in such manner as not to affect each other's brilliancy. Fig. 9 illustrates diagrammatically a modified arrangement of primary and secondary coils. Fig. 10 is a side view of a modified form of commutator. Fig. 11 shows a vibrating or reciprocating commutator adapted for use with a primary coil having two divisions, into which divisions the current is shifted consecutively. Fig. 12 shows an arrangement in which one of the divisions of the primary is dispensed with.

Figs. 13 and 14 show other constructions of commutator that may be employed in carrying out my invention. Fig. 15 is a diagram illustrating one of the applications of my invention. Fig. 16 illustrates diagrammatically a means of keeping the electro-motive force of the secondary constant despite fluctuations in the main-line current. Fig. 17 illustrates a modified arrangement of the primary and secondary coils. Fig. 18 shows a modified arrangement of condenser as used with the induction-coil. Figs. 19, 20, and 21 show arrangements of devices whereby the electro-motive force on the secondary may be regulated according to my invention.

Referring to Fig. 1, A B indicates a portion of a circuit upon which a continuous or constant current from any source flows.

C D indicate, respectively, the primary and secondary coils of an inductorium or induction-coil provided, as usual, with an iron core, K, consisting of a bundle of iron wire or sheets of iron, all constructed in any desired manner. Said core is made adjustable within the coil, by preference, so as to permit the electro-motive force of the secondary currents to be regulated either by hand or automatically by the means to be hereinafter described.

One or more secondary coils, as well as one or more primary coils, may be used, as is obvious, upon the same core. A single primary and single commutator therefor may be employed, if desired; but I prefer in general to use a primary divided into two or more sections, and to change the current from one section to the other in succession.

In Figs. 1 and 2 I have illustrated a primary coil made in two divisions and combined with a single commutator, as will be presently described. The terminals 2 2 of the secondary coil, which latter is made of wire of any gage suited to the needs of current and electro-motive force to be taken from it, are carried to the circuit containing electric lights or other apparatus, L L, which latter are here indicated as incandescent lights arranged in multiple arc. The two portions of the primary are indicated in Fig. 2 at 3 5, where the main conductor A is shown as branching through said coils in order to reach its continuation at B. As indicated, current entering at A would pass oppositely in the two halves of the primary coil, in order to reach the brushes E E' of a commutator, to which the ends of said coils are respectively connected.

The two portions 3 5 may be superposed, interwound, or may occupy different longitudinal positions over the core.

In a bridge, between the two terminals of the induction-coil, is a condenser, F, of ample size to condense any extra currents engendered in the primary coil. The commutator shown in this figure is a revolving commutator, upon whose cylindrical surface the brushes E E' bear, and consists of a conducting-segment, V, which is in constant connection with the main conductor B, and a segment, W, which is insulated from the segment V. The brushes E E' have sufficient bearing upon the cylinder, so that the segment V shall be always in contact with one or the other of them, and a constant circuit shall be thus provided for the current upon the line A B. Constant connection with the segment V may be maintained by any suitable means—as, for instance, by the device (well known in the art) of a continuous ring mounted upon the same shaft with V and electrically connected with it, and a brush bearing on the ring and connected with the wire B.

The commutator may be revolved by any suitable device, as by clock-work or by gearing connecting it with any source of power. I find, however, that a small electric motor driven by the electric current supplied through conductor A B is much to be preferred. Such an electric motor is indicated at M, with its coils in the circuit A B and operatively connected with the commutator by a belt. A switch, S, serves to shunt the motor M to stop its action. When the switch is turned to the position shown in the drawings, the current on the circuit A B flows through the motor; but when the switch is turned to make contact with the button $b^2$ the current passes around said motor, bringing it to a stop.

Though not essential to the operation, I find it far preferable to run the commutator in such way that it may have a constant lubrication by mineral oil. It is here shown as running in a closed oil-case, in which is a quantity of oil (indicated at O) sufficient in amount to permit the commutator to run just in contact with the oil surface.

I wish it distinctly understood that I may modify the mode of oiling indefinitely, and that, however the parts are disposed to that end, the continuous oiling is a feature of such a commutator for induction apparatus, as it greatly enhances the uniformity of delivery of current in the secondary circuits. The movement of the commutator effects such oiling in obvious way. A stream of oil might be allowed to run upon it, or wings or blades made to scatter oil in the case so as to splash upon the commutator.

Having now described the typical elements of my invention, I will proceed to describe their operation, and afterward to point out some of the modifications of more or less desirability that may be made without departing from the spirit of the invention.

By the revolution of the commutator, driven at a high rate of speed by the electric-motor mechanism M, connection is alternately made from brushes E E' to conductor B through the conducting-segment V without interruption of circuit. There results from this a passage of current at one instant of time from A through primary coil-section 3 to E and to B, and at the next instant from A through primary coil-section 5, brush E', and to B; but as coils 3 and 5 are reversely wound, so as to magnetize the core K oppositely, there will be reversals of magnetism in K corresponding in number with the number of changes of current in 3 and 5. These reversals develop current in the secondary D, which current finds circuit through the lamps L or other apparatus. The condenser F enhances the effects by absorbing and discharging the extra currents developed in the primaries at the instant of rupture of the segment V with brushes E E'. The lubrication furnished by the body of oil O gives great definiteness to the makes and breaks and secures a uniform discharge in the secondary. Copious lubrication is needed, as mere ordinary oiling does not enhance the effects to any appreciable degree.

In Fig. 3 the coils 3 5 are placed to either side of the secondary coil D. This arrangement conduces to effective insulation between them. It is desirable to suspend both sets of coils in free air, so that they shall be separated from each other and from the core K by a clear air-space all around. This plan should be adopted where the main-line current is of very high potential—say three thousand volts or over. The coils may be suspended in any desired manner, suitable provision being made for insulation.

In Fig. 5 I have indicated a secondary coil divided into three sets or sections, D D' D², the terminals of which sections are connected to the plates $a\ a'\ b\ b'\ c\ c'$ of an electric switch having plug or socket holes between the several plates adapted for the insertion of connecting metallic plugs. By connecting the plates as shown in Fig. 5 the secondary coils may be thrown into series to obtain increased tension; or by connecting them as shown in Fig. 6 they may be placed in multiple arc for quantity effect; or by other arrangements of the plug they may be placed in multiple arc and series, so as to adapt the electro-motive force to the demands of the apparatus supplied with secondary current. For the same ends the core of the coil D may be partially or entirely withdrawn, as indicated in Fig. 7. To regulate the effects, the primaries may be fixed or may move with the cores K; or the secondary alone may be the movable portion. All these variations, being well known in the art, have not been herein illustrated.

Ordinarily the removal of a light or lights or other apparatus connected with the secondary would demand a readjustment of the speed of the commutator or of the relation of the coils and core, in order to prevent undue flow of current to the remaining lamps. To obviate this, a small reactive coil of low resistance wound upon an iron core, as indicated at R, Fig. 8, may be employed and combined with a suitable switch, whereby upon the cutting out of the lamp said coil may be made to take its place. I mean by a "reactive coil" a coil whose opposition to the passage of alternating currents through it is due simply to its counter electro-motive tendency and not to its resistance. The coils R R of Fig. 8 are of this nature, and since the secondary currents are alternating in character the substitution of one for a light extinguished leaves the relation of the electro-motive forces to the remaining lamps constant, so that they do not change their brilliancy. The employment of a reactive coil in this manner forms the subject of claims in another application for patent filed by me March 19, 1883, and I do not therefore claim the same, broadly, herein.

In Fig. 9 two secondary coils, D D', are indicated as in inductive relation to the two primaries 3 5. The primaries may be wound on separate cores or the same core, and the secondaries may be employed separately or together for working local lines. In the modified form of commutator, Fig. 10, three conducting segments or blocks V are provided, and three corresponding insulating segments, W W W. The segments V are in constant connection with conductor B, as before, and the proportions are such that one or the other of the brushes E E' shall be at any time in contact with one or the other of the segments V. A vibrating commutator, which may be substituted for the rotary commutator shown in the preceding figures under some conditions, is illustrated in Fig. 11.

The vibrating lever M² carries at opposite sides of its pivot contacts V, and is provided with an armature by which it may be moved first in one direction and then in the other by the electro-magnets I J, which are in the circuits, respectively, from the terminals of the primary coils 3 5 to the contact-springs E E'. The lever and the contacts V V are connected with the wire B. When the lever is set into vibration, the contacts V V will alternately open contact with the springs E E'. Thus current from A passing through electro-magnet I to E', V, and B, will energize said magnet and pull the armature-lever M² over, so as to break contact with spring E' and make firm contact with spring E. By the latter contact circuit is made through 5, J, E, and to B, so that the armature-lever will now be pulled in the opposite direction, thus opening contact at E and again making contact at E', so as to cause a repetition of the operation. Coils 3 and 5 are the primaries; but I and J might be used as such, and their cores be still made to act on the vibrating armature or armatures carried by the lever M². One of the sections of primary coil may be dispensed with and its place taken by a simple short conducting-wire, 7, as indicated in Fig. 12, in which case all inductive actions in the arrangements hereinbefore described may be obtained from interruptions in the remaining primary, 3, alone.

If desired, instead of connecting the terminals of the primaries to brushes E E', they may be connected to the two conducting-segments V V' of a revolving commutator, as indicated in Fig. 13, constant connection with said segment being preserved by any desired means. In this case the circuit terminals A B would be connected with the brushes E E', as indicated. The segments V V' may each extend over about one hundred and twenty degrees of the circumference of the commutator-cylinder. A short-circuiting piece, T, revolving with the commutator and beneath the brushes, serves to connect the two portions A B of the circuit, while both segments V V' are out of contact with the brushes. During revolution the current from the circuit A B is reversed through coil 3 and short-circuited through T alternately. A simple pair of half-circles might be substituted for the segments V V', as shown in Fig. 14. The effects are, however, not so constant with this construction, being more dependent on the wear of the commutator and springs.

In Fig. 15 I have illustrated a pair of induction apparatus as operating upon the same main line A B, upon which latter are lamps—such as L'—are operated. The commutators of the two apparatus are worked from the same electric motor M. The secondary coil D' is shown as supplying electric-arc lamps at I. The secondary coil D supplies incandescent lamps L.

One arrangement of apparatus that may be used for regulating the action of the inductorium by the controlling agency of a magnet or other device connected with the secondary coil is shown in Fig. 16. This arrangement is valuable, especially where the main-line current is subject to fluctuations of volume that would affect the electro-motive force of the secondary current. It is also useful in permitting extinguishment of lights or the throwing out of other apparatus on the secondary circuit.

N indicates an electro-magnet placed in a high-resistance circuit from the terminals of the secondary coil—that is, in parallel arc with the lights or other apparatus, L L—although it may be placed in any other desired electrical connection with the secondary without departing from the invention. This magnet is the controlling-magnet, and by its agency the speed of the commutator for the primary is controlled. This may be effected by controlling the speed of the driving electric motor M, and the latter object may be secured in any of the well-known ways, as by shunting current from a part or a whole of the electric motor, by shunting a part or the whole of its coils, or by open-circuiting them, or in any other equivalent electrical way. In the present case the electro-magnet N is supposed to short-circuit the whole motor by means of contacts $q$, which are closed when the strength of the magnet reaches a predetermined degree. The strength of current required to effect short-circuiting is determined by any desired adjustment—as, for instance, by the adjustment of a retracting spring acting upon the armature-lever of the magnet N in opposition to said magnet. The speed of the motor M is thus made directly dependent upon the difference of electro-motive force between the terminals of the secondary. The said electro-motive force will obviously vary with the rapidity of the reversals or changes in the primary, other things being equal, and, conversely, the shunting or otherwise lowering of the speed of the motor will diminish the effect in the secondary.

The electro-magnet N may be of any desired form, and may, if desired, be constructed to have a uniform pull upon its core or armature in all positions of the latter with the same strength of current.

In the modified arrangement of primary and secondary coils shown in Fig. 17 separate secondaries, D D', are shown as placed between two primaries, 3 5. In Fig. 18 the condenser is shown as made up of two separate condensers, F F', one foil or set of foils in each being connected to the terminal B, and the other foil or sets of foils connected, respectively, to E and E'.

Fig. 19 shows another arrangement of devices that may be employed for automatically regulating the action of the induction-coil by automatically varying the speed of the commutator. In this case the magnet N, when it acquires a predetermined power, serves to bring into action a brake, which decreases the speed of the driving-motor for the commutator. The motor is in the present instance shown as an electric motor, M, but might be any other form or construction of motor.

The brake is applied by an electro-magnet, U, which may be in the circuit A B, as indicated, with the motor, or may be energized from any desired source. The armature-lever of the electro-magnet U applies a brake shoe, Y, carried by said lever, to the electric motor in obvious ways. The electro-magnet N brings the magnet U into action by opening the contacts indicated at P, which latter normally close a shunt-circuit around the electro-magnet U, so as to normally keep the latter out of action. When the electro-motive force of the secondary D is excessive, the contacts at P are opened by the electro-magnet N and the brake Y slows the motor. Mechanical devices might be substituted for the electro-magnetic brake if properly arranged, to be controlled and applied upon an increase in the power of the electro-magnet N. By the arrangement shown in Fig. 20 an automatic regulation of the action of the induction apparatus may be obtained by shifting the core of the induction-coil. Core K is moved or adjusted in opposite directions by a weight, C', connected with one end of the core, and moving, preferably, in a dash-pot, and by a wheel, $g$, carrying a pinion that engages with a rack attached to the opposite end of the core, or connected with said core in any other suitable manner. The wheel $g$ is driven by a second wheel and pinion, which latter are automatically geared to the electric motor M or to any other driving mechanism by means of a shifting-wheel, $r$, which is mounted on a movable support, and may be brought simultaneously into gear with the motor and with the wheel connected to $g$.

The wheel or roller *r* is here shown as mounted upon a lever carrying the armature for the electro-magnet U, the action of the latter being controlled by a magnet, N, in substantially the same manner as the magnet U of Fig. 19. When the roller *r* is geared with the motor M and the driving wheel or wheels *g*, the core K will be withdrawn from the coil D against the action of the weight C', and a diminution in the electro-motive force of the secondary current will result. When the power of the magnet N reaches or is restored to its normal, so as to complete the shunt for magnet U, and thus permit the roller *r* to be disengaged by a suitable retractor, the weight C' will draw back the core into its proper place. The same effects may be obtained, also, by reversing the functions of the parts, as indicated in Fig. 21. Here the weight C' is arranged to pull the core K out of the coil D, and the gearing *g* is arranged to pull it into place in said coil. The magnet U is shunted by the contacts P, when the current in the magnet N increases, owing to the too great electro-motive force of the secondary D. At this moment the gearing is disconnected from the motor M by the falling away of the roller *r*, and the weight C' begins to draw the core out of the coil. The renewal of the power of U, owing to the diminution in the power of N, and the opening of the shunt-contacts P by the retractor for N, restrains such action by the putting of roller *r* into place to connect the motor M and wheel *g*, this action occurring when the electro-motive force of the secondary has fallen to normal. By either of the devices, Figs. 20 and 21, a balance is soon effected between the position of the core K and the strength of the magnet N, dependent on the electro-motive force of the secondary D. Other means may be employed for determining the action of the secondary coil or inductorium, provided they be arranged to be controlled in position or action by the agency of the magnet N, or other device energized by the currents set up in the secondary coil. I have shown but a few of the forms of commutator that may be employed in carrying out my invention. Others may be used without departing from the spirit of the invention, the object being in any case to produce the changes in the primary coil or coils required for producing induced currents in the secondary by an apparatus without causing any change, reversal, or interruption of the general circuit, excepting in those portions thereof containing the secondary coil or coils, so that a continuous or uninterrupted flow of current may be maintained through any apparatus upon the same general circuit with the primary coils, and other devices may be energized or operated by said current without interference from the action of the commutator in setting up currents for running lamps or other devices by the secondary currents of the induction-coil.

I am aware that it is not broadly new to utilize for operating electric lamps or other translating devices a secondary current generated by changes in the primary through the medium of a circuit shifter or commutator; but I am not aware that any one has yet devised the system and apparatus described in the foregoing specification, and more particularly set forth in the claims.

The specific features of my inductorium are not claimed in this application; but I reserve the right to claim them in a future application.

The novel electric-lighting system herein described and comprising arc and incandescent lamps placed, respectively, in series on the main line and on a local circuit inductively, united with the main by the induction-coil, is not herein claimed, being made the subject of a separate application for patent filed by me. Likewise the mounting of the coils so as to be surrounded by free air-space, and the combination, with the secondary coils, of a switch for uniting said coils in series or in multiple arc, or in series multiple arc, are not claimed herein, but in the separate application referred to.

What I claim as my invention is—

1. The combination, with a main line conveying an electric current, of an induction-coil having a compound primary, a current-transferring commutator for said primary, and a condenser attached to the ends of the compound primary leading to the commutator.

2. The combination, with an induction-coil having its primary divided into two portions, of a source of electric current, a commutator connected to the two portions in the manner described, so as to permit the current to pass oppositely in the two portions of the coil in turn, and a secondary coil exposed to the inductive action of both portions of the primary.

3. The combination, with the main-line circuit, of the induction-coil, a commutator connected with the main line and primary, an electric motor connected to the main line for operating the commutator, and a shunting-switch for closing a main-line circuit around the motor, whereby the latter may be put out of action.

4. In combination with an induction-coil, a local line connected with its secondary, and containing translating devices, and reactive coils having switches, whereby reactive coils may be substituted for lamps extinguished.

5. The combination, with an induction-coil, of a governing-magnet for controlling the action of said induction-coil, said controlling-magnet being connected to the secondary circuit of the induction-coil, as and for the purpose described.

6. The combination, with a line-circuit, of one or more induction-coils, translating devices connected with the secondaries of said induction-coils, and governing-magnets for controlling the action of said induction-coils, said magnets being connected with the secondaries of said induction-coils.

7. The combination, with the current-controlling devices for the primary of the induction-coil, of a governing-magnet actuated by a current from a secondary coil, whereby when the electro-motive tendency of said secondary increases said governing-magnet may be brought into action to lessen the rate of distribution of current to the primary coils, and thereby lessen the effect in the secondary.

8. A motor controlling the switch devices or commutator of the primary of an inductorium, in combination with a controlling-magnet in a branch from the secondary and intermediate mechanism, substantially as described, whereby the said controlling-magnet lessens the effect of said motor upon increase of said magnet's power.

9. The combination, with an induction-coil, of a commutator, an electro-magnetic actuating device therefor, a speed-controller for the latter, and a governing electro-magnet or other suitable device responding to changes in a circuit taken from the secondary of the induction-coil.

10. In a system of electrical distribution, an inductorium, an electro-magnet in the secondary circuit thereof, and mechanism controlled by the said magnet for shifting the core of the inductorium, substantially as and for the purpose set forth.

Signed at Lynn, in the county of Essex and State of Massachusetts, this 15th day of May, A. D. 1884.

ELIHU THOMSON.

Witnesses:
E. W. RICE, Jr.,
E. B. DOERR.